(12) United States Patent
Eskicioglu et al.

(10) Patent No.: US 7,039,802 B1
(45) Date of Patent: May 2, 2006

(54) CONDITIONAL ACCESS SYSTEM FOR SET-TOP BOXES

(75) Inventors: Ahmet Mursit Eskicioglu, Indianapolis, IN (US); Keith Reynolds Wehmeyer, Fishers, IN (US); David Emery Virag, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/445,132

(22) PCT Filed: Jun. 5, 1998

(86) PCT No.: PCT/US98/11633

§ 371 (c)(1), (2), (4) Date: Mar. 13, 2000

(87) PCT Pub. No.: WO98/56179

PCT Pub. Date: Dec. 10, 1998

Related U.S. Application Data

(60) Provisional application No. 60/048,819, filed on Jun. 6, 1997.

(51) Int. Cl.
*H04L 9/00* (2006.01)

(52) U.S. Cl. .............. 713/156; 713/168; 713/171; 713/175; 380/255

(58) Field of Classification Search ............ 713/175, 713/168, 171, 156; 380/255
See application file for complete search history.

(56) References Cited

U.S. PATENT DOCUMENTS

| | | | |
|---|---|---|---|
| 5,533,123 A | * | 7/1996 | Force et al. ............... 713/189 |
| 5,625,693 A | * | 4/1997 | Rohatgi et al. ............ 713/187 |
| 5,652,795 A | | 7/1997 | Dillon et al. |
| 5,761,309 A | * | 6/1998 | Ohashi et al. ............ 713/156 |
| 5,787,172 A | * | 7/1998 | Arnold ...................... 713/175 |
| 6,085,320 A | * | 7/2000 | Kaliski, Jr. ............... 713/168 |

FOREIGN PATENT DOCUMENTS

| | | |
|---|---|---|
| EP | 0438154 | 7/1991 |
| EP | 0719045 | 6/1996 |
| EP | 0817485 | 1/1998 |
| JP | 62-254543 | 11/1987 |
| JP | 9-74408 | 3/1997 |
| WO | 97/16924 | 5/1997 |
| WO | 97/24832 | 7/1997 |
| WO | 97/38530 | 10/1997 |

OTHER PUBLICATIONS

Schneier, Bruce; Applied Cryptography; 1996; John Wiley & Sons, Inc.; 2nd Edition; pp. 1-74, 561-595.*

Omura, J.K.: "Novel Applications of Cryptography in Digital Communications," IEEE Communications Magazine, vol. 28, No. 5, May 1, 1990, pp. 21-29.

PCT Search Report dated Sep. 2, 1999.

* cited by examiner

*Primary Examiner*—Gilberto Barron, Jr.
*Assistant Examiner*—Jung Kim
(74) *Attorney, Agent, or Firm*—Joseph J. Laks; Robert D. Shedd; Paul P. Kiel

(57) ABSTRACT

A system conditionally establishes a communication channel between two devices only if one device is authenticated by the other device. Authentication of the second device by the first device involves sending a message to the second device; receiving, from the second device, the message encrypted using a private key of the second device and a digital certificate having a public key of the second device; decrypting the digital certificate to obtain the public key, using the public key to decrypt the message and comparing the decrypted message to the message originally sent to the second device.

6 Claims, 3 Drawing Sheets

CONDITIONAL ACCESS SYSTEM FOR SET-TOP BOXES

This application claims the benefit of Provisional Application No. 60/048,819, filed Jun. 6, 1997.

FIELD OF THE INVENTION

This invention concerns a system for providing conditional access (i.e., managing access) to a device, such as a "consumer electronic device". Examples of such consumer electronic devices include separate devices or "boxes" that may be located on top of, and coupled to a television receiver, i.e., set-top boxes.

BACKGROUND OF THE INVENTION

In general, conditional access involves limiting or controlling the communication with a device based on predetermined criteria. Conditional access may be achieved by connecting two devices together when communication therebetween is desired and by disconnecting the two devices from one another when such communication is no longer desired. However, in the context of today's sophisticated computer networks interconnected to form what is known as the world-wide web ("web"), many, if not all, of the devices designed to communicate with the web are "permanently" connected to the web through modem hookups or other means. That is, the devices usually remain physically connected to the web. Typically, access to the web is via a specially designed software package loaded onto a computer and a modem; this software enables a user to connect to an internet service provider who acts as the gate keeper to the web. The user typically pays a monthly fee to the service provider for access to the internet, either on a limited or unlimited basis. The proliferation of users who regularly access the web as a source of information or even as a means of communicating via E-Mail for both business and personal reasons has created a very competitive market for both service providers and the manufacturers of the necessary hardware. Thus, as one would expect there are numerous service providers, each requiring specialized software for access.

An outgrowth of today's emerging digital consumer electronic products is an opportunity to access the Internet from a user's television. Such access has been accomplished by utilizing the user's television as a monitor or display device in conjunction with a set-top box that provides the software (e.g., a web browser) and hardware (e.g., modem, ethernet, ADSL or any equivalent connection means) needed to interface to the web. For example, the RCA Network Computer manufactured by Thomson Consumer Electronics is such a set-top box that may be connected to both a television and a phone line or the like thereby permitting the user to access the web. Set-top boxes may provide a means for a variety of internet applications (e.g., electronic commerce) from the home, the office or any location without utilizing a personal computer or any general purpose computing device. These set-top boxes have open hardware architectures which would permit easy adaptation of the set-top box thereby permitting use with any of a plurality of service providers.

SUMMARY OF THE INVENTION

The manufacturers of these set-top boxes may desire that the box only be used with selected service providers. For example, the manufacturer of the box may be compensated by the service provider for each connection to the service from the box. Thus, the flexibility of the set-top box's open hardware architecture in combination with a competitive market for such devices necessitates the need to provide a system for providing conditional access in the set-top box so that the box can only connect to selected service providers. This invention resides, in part, in recognition of the described problem and, in part, in providing a solution to the problem.

Generally, the present invention defines a method for managing access to a device by sending a first message to a second device; receiving a digital certificate encrypted using a first private key; receiving the first message encrypted using a second private key; authenticating the second device; and establishing a communication channel between the devices.

In accordance with one aspect of the present invention, the first message comprises data associated with the first device and a date and time stamp, and the digital certificate comprises data associated with the second device and a second public key.

In accordance with another aspect of the present invention, the step of authenticating comprises decrypting the digital certificate using a first public key; decrypting the first encrypted message using the second public key to generate a first decrypted message; and comparing the first decrypted message to the first message.

In accordance with another aspect of the present invention, the method further comprises providing confirmation of the authentication to said second device by encrypting the first message using the second public key to generate a second encrypted message; and sending the second encrypted message to the second device.

In accordance with still another aspect of the present invention, the digital certificate, the first public and first private keys are issued by an independent certificate authority and are associated with the second device.

In accordance with yet another aspect of the present invention, a system for managing access between a service provider and a set-top box having a smart card coupled thereto, the set-top box sends a first message to the smart card; receives a smart card (first) digital certificate encrypted using a private key; authenticates the smart card; contacts the service provider and sends a second message to the service provider; receives a service provider (second) digital certificate encrypted using another private key; receives the second message encrypted using yet another private key; authenticates the service provider; provides confirmation to the service provider; and establishes a communication channel with the service provider. Particularly, the two messages contain at least set-top box identification data.

In accordance with yet another aspect of the present invention, the smart card includes service provider identification data associated with a plurality of service providers.

These and other aspects of the invention will be explained with reference to a preferred embodiment of the invention shown in the accompanying Drawings.

DETAILED DESCRIPTION OF THE DRAWINGS

The present invention provides a conditional access system which may be utilized to obtain services from one of a plurality of sources. When implemented within a set-top box, the conditional access system permits the set-top box to authenticate the service provider and/or a smart card used to access services before a communication channel is established. Such a conditional access system may act as a toll bridge for access to services, thereby permitting a mechanism for the manufacturer of the set-top box to collect fees based on use of its set-top box.

Figure 1:
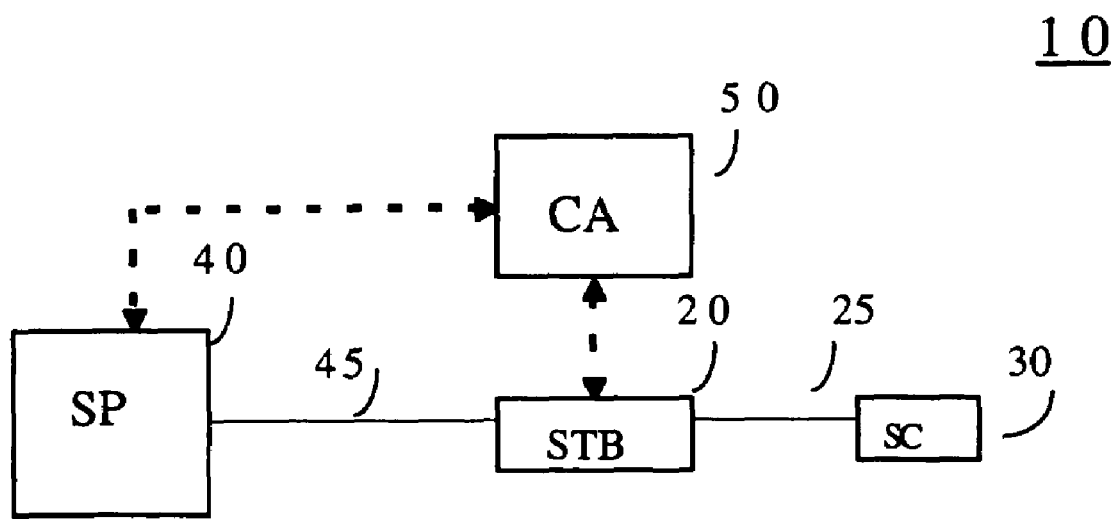
FIG. 1 is a block diagram of an exemplary implementation of a system for managing access to a device in accordance with the invention.

In FIG. 1, the system 10 for managing access to a set-top box (STB) 20, for example, the RCA Network Computer, is depicted. Smart Card (SC) 30 is inserted into or coupled to a smart card reader (not shown) included in STB 20; an internal bus 25 interconnects STB 20 and SC 30 thereby permitting the transfer of data therebetween. Alternately, the functionality of the smart card may be embedded within the set-top box. STB 20 is connected to service provider (SP) 40 via a dial-up link or a direct link, which is depicted as element 45. Certificate Authority (CA) 50 is not directly connected to either SP 40 or STB 20 but issues digital certificates and public and private key pairs, which are used as explained below. These digital certificates are used by service providers and smart card manufacturers. It is within the scope of this invention that the digital certificates could be provided via an on-line connection. Further, it is within the scope of this invention that the role of Certificate Authority may be performed by SP 40 in collaboration with the manufacturer of the STB 20. The conditional access system of the present invention will be described in relation to system 10 as shown in FIG. 1 and the flowchart diagram of FIG. 2.

This conditional access system is based on authentication of each device (for example, SC 30 and SP 40) communicating with STB 20 prior to establishing a communication channel between a STB 20 and SP 40. Particularly, this conditional access system utilizes an asymmetric key system (i.e., public-key system), wherein only public keys are stored in the set-top box. That is, the set-top box does not store or contain any secrets (i.e., private keys). The foundation of public-key cryptography is the use of two related keys, one public and one private; the private key being computationally unfeasible of being deduced from the public key which is publicly available. Anyone with a public key can encrypt a message but only the person or device having the associated and predetermined private key can decrypt it. Similarly, a message can be encrypted by a private key and anyone with access to the public key can decrypt that message. Encrypting messages using a private key may be referred to as "signing" because anyone holding the public key can verify that the message was sent by the party having the private key. This may be thought of as being analogous to verifying a signature on a document.

A digital certificate or certificate is a message sent in the clear (i.e., unencrypted) having a CA 50 signature attached thereto; thus the recipient of the certificate can verify the source or origin of the certificate. These digital certificates are in fact "signed messages" because the signature attached to the message is produced by encrypting either the message itself or a digest of the message (which is obtained by hashing the message, as described later). Unilateral authentication of each device connected to the set-top box is achieved by passing such certificates between the devices and verifying these certificates. Certificate verification involves checking the signature by decryption. These certificates may contain information used by the device receiving the certificate. This information may be related to a device not involved in the passing of this certificate, e.g. information contained in the first digital certificate is related to the service provider as described below. Further, the certificates may contain information associated with the device passing the certificate and a public key of the passing device.

As described above, only public keys are stored in a memory device contained in STB 20. Further, the first and second digital certificates, which may be issued by CA 50, are stored in SC 30 and SP 40, respectively.

The following nomenclature will be utilized in the below description of the present conditional access system.

| | |
|---|---|
| KCApri1 | Private key used to create SC's certificate |
| KCApub1 | Public key used to verify SC's certificate |
| KCApri2 | Private key used to create SP's certificate |
| KCApub2 | Public key used to verify SP's certificate |
| KSPpub | SP's Public key |
| KSPpri | SP's Private key |

These are used and discussed with respect to authenticating a device such as the smart card or the service provider.

Figure 2:
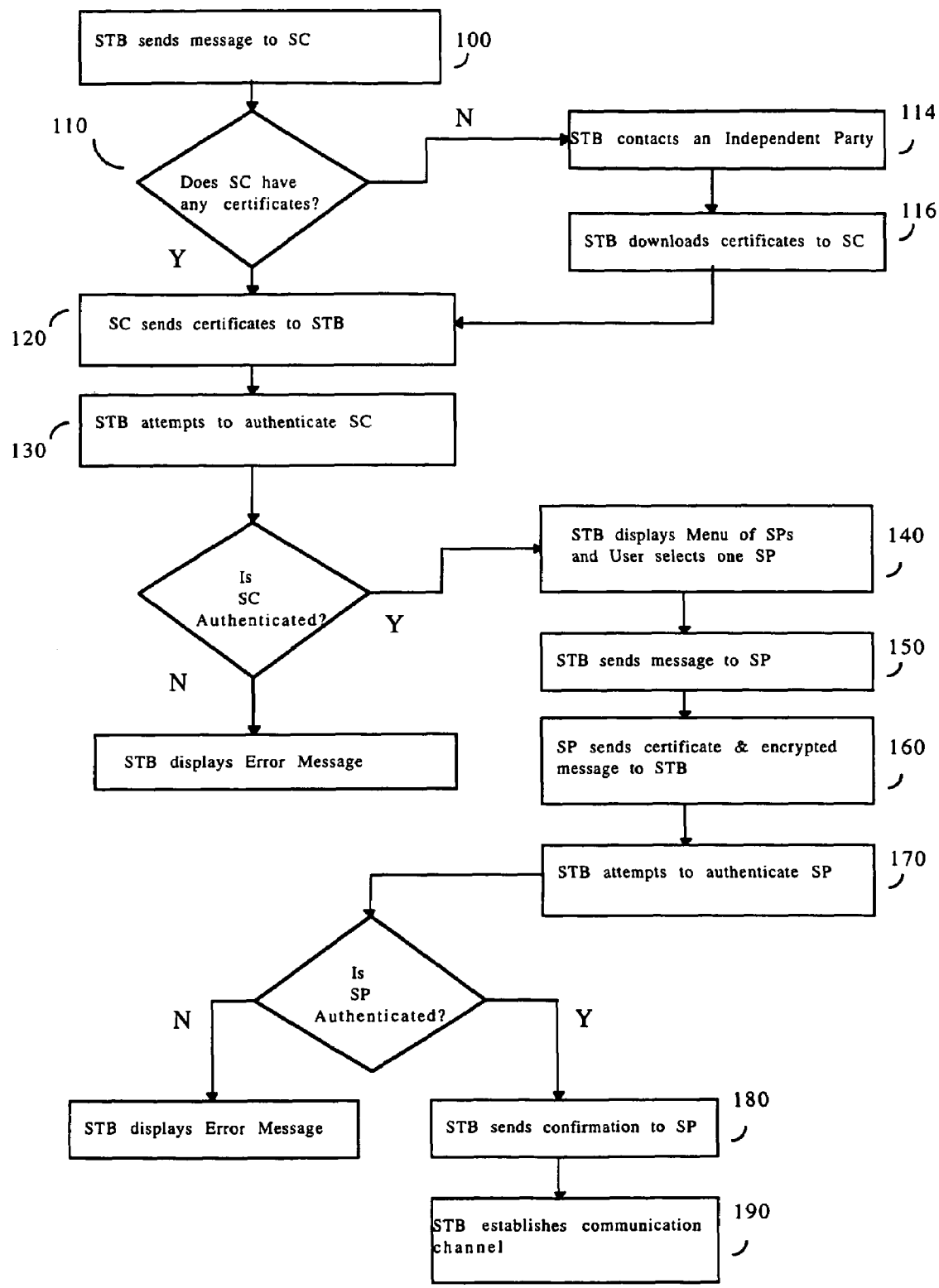
FIG. 2 is a flowchart diagram of an exemplary implementation of the conditional access system of FIG. 1.

After STB 20 is activated and SC 30 is inserted into STB 20, STB 20 sends a first message to SC 30 (see FIG. 2, Step 100). This first message contains identification data corresponding to STB 20, for example, such identification data may include the manufacturer's identification data (MID). In response to the first message, SC 30 replies by sending a first digital certificate back to STB 20 (see FIG. 2, Step 120). The first digital certificate (i.e., SC's certificate) includes data sent in the clear and an attached signature which is encrypted using KCApri1, the private key which is used to create certificates sent by SC 30. This data may include identification data corresponding to a selected service provider having a pre-existing agreement with the manufacturer of STB 20. Particularly, this data may also include, in addition to the service provider identification data, a phone number for the service provider which will be used for contacting the service provider as described below.

If SC 30 does not have a digital certificate associated with a service provider (see FIG. 2, Step 110), STB 20 may contact an independent party (not shown), download an appropriate digital certificates from the independent party (see FIG. 2, Step 114) and transfer them to SC 30 (see FIG. 2, Step 116). STB 20 may contact the independent party utilizing an integrated modem. If the digital certificates are downloaded from the independent party, the above process may continue starting at the point where SC 30 replies to the first message by sending a first digital certificate back to STB 20.

Now, STB 20 must authenticate (see FIG. 2, Step 130) SC 30 by verifying that SC 30 has passed a valid certificate to STB 20, this involves decrypting the first digital certificate in STB 20 using KCApub1. KCApub1, which is stored in STB 20, is the corresponding public key also assigned by CA 50. After SC 30 is authenticated, the service provider identification data included in the first digital certificate is used by STB 20 to contact the desired service provider, for example SP 40.

SC 30 may have more than one digital certificate, each one of which may identify a different service provider. If this is the case, the user may be prompted to select one of the service providers having a valid certificate (see FIG. 2, Step 140). Further, if a service provider has more than one access number, the set-top box may select an alternate number if, for example, the primary number is busy.

STB 20 sends a second message to SP 40 (see FIG. 2, Step 150); this second message contains similar identification data corresponding to STB 20. For example, such identification data now may include the manufacturer's identification data (MID) and a date and time stamp (DTS). DTS may be downloaded from an electronic program guide or from a special time server or possible through an internal means. In response to the second message, SP 40 replies by sending (1) a second digital certificate (i.e., SP's certificate) and (2) the second message encrypted using KSPpri back to STB 20 (see FIG. 2, Step 160). The second digital certificate includes data sent in the clear and an attached signature which is created using KCApri2. This data may include identification data corresponding to the service provider, the validity period (VP) for the second digital certificate and the public key for SP 40, i.e., KSPpub. The identification data may also further include data associated with CA 50 which may be utilized, if necessary, for authentication of SP 40. Now SP 40 must be authenticated; such authentication is achieved utilizing the second digital certificate and the encrypted second message (see FIG. 2, Step 170).

Particularly, authentication of the service provider involves (1) decrypting the second digital certificate in STB 20 using KCApub2, which is stored therein, (2) decrypting the encrypted second message using the public key of SP 40 (i.e., KSPpub) which is included in the second digital certificate and (3) comparing the decrypted "encrypted second message" to the original second message sent to SP 40. This ensures that the certificate was received from the desired service provider and not from another source.

Further, the data contained in the second digital certificate may be subjected to a one-way hashing algorithm, such as MD5 developed by Ron Rivest or SHA-1 developed by the National Institute of Standards and Technology (NIST) and the National Security Agency (NSA) prior to being encrypted by KCApri2. If this is the case, authentication may also include hashing the data sent in the clear using the same one-way hashing algorithm and comparing this data to the decrypted data. Similarly, the creation of the first digital certificate may involve the use of such a one-way hashing algorithm.

After SP 40 has been authenticated by STB 20, STB 20 sends confirmation of this authentication back to SP 40 (see FIG. 2, Step 180). This confirmation involves sending the second message now being encrypted using the public key of SP 40, i.e., KSPpub, back to SP 40. SP 40 can decrypt this message using its associated private key, KSPpri. Finally, STB 20 establishes a communication channel (see FIG. 2, Step 190) between STB 20 and SP 40 wherein all future communication may be handled utilizing public-key cryptography and the public and private key pairs associated with SP 40 (i.e. KSPpub and KSPpri).

Figure 3:
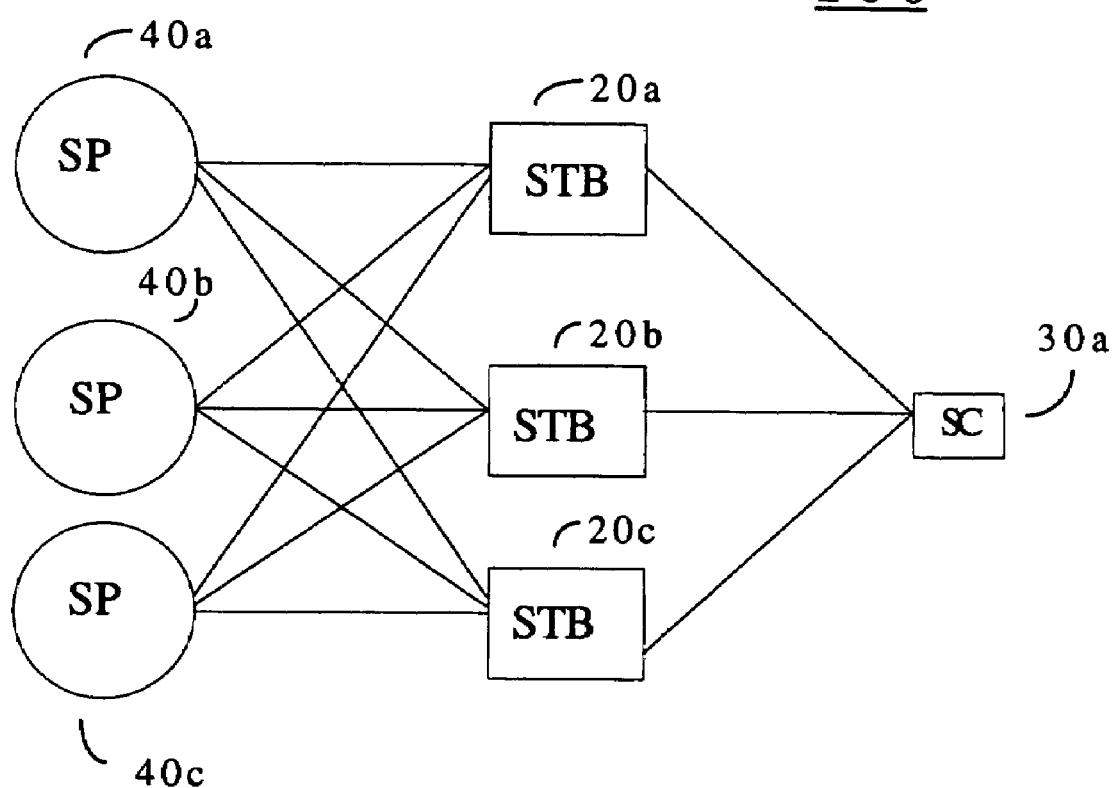
FIG. 3 is a block diagram of an exemplary implementation of the system of FIG. 1 wherein any one of a plurality of set-top boxes may communicate with any one of a plurality of service providers.

The present invention has been described in terms of an exemplary embodiment in which a single smart card cooperates with a single set-top box to manage access to a single service provider. However, it is within the scope of this invention to provide a conditional access system which may be extended to permit the smart card to "roam" across (i.e., provide conditional access between) multiple service providers and multiple manufacturers of the set-top boxes. This is particularly illustrated in FIG. 3 where SC 30a may be used in any one of STBs 20a, 20b or 20c to access any one of SPs 40a, 40b or 40c. In such a system, each set-top box manufacturer will have a unique MID. The smart card will have a unique first digital certificate for each service provider and for each manufacturer having a predetermined agreement with the service provider. Each set-top box will have unique sets of public keys for verifying these digital certificates. For example, if there are "m" service providers and "n" manufacturers of set-top boxes then the smart card may contain up to "m times n" number of digital certificates.

While the invention has been described in detail with respect to numerous embodiments thereof, it will be apparent that upon a reading and understanding of the foregoing, numerous alterations to the described embodiment will occur to those skilled in the art and it is intended to include such alterations within the scope of the appended claims. Further, it is within the scope of the present invention that the conditional access system defined herein is fully capable of being utilized between any two devices interconnected.

The invention claimed is:

1. A method for managing access between a plurality of electronic devices, comprising:
   sending first message data from a first electronic device to a second electronic device;
   receiving, in said first device, from said second device, second data being indicative of a digital certificate encrypted using a first private key of said second device;
   receiving, in said first device, from said second device, said first message data being encrypted using a second private key of said second device;
   authenticating said second device in response to said digital certificate and said first encrypted message;
   encrypting said first message using a public key related to the second private key of said second device to generate a second encrypted message;
   sending data indicative of said second encrypted message to said second device; and
   establishing a communication channel between said first and said second devices in response to the authentication of said second device.

2. The method of claim 1 wherein said digital certificate, said public key and said first private key are issued by an independent certificate authority and are associated with said second device.

3. The method of claim 2 wherein said first device is a set-top box and said second device is a server associated with a service provider, the set-top box having a smart card with service provider identification data stored therein coupled thereto, the set-top box sending said first message to said server in response to authentication of said smart card and said service provider identification data.

4. The method of claim 3 wherein said digital certificate data further comprises data associated with a certificate authority and data associated with the validity of said digital certificate.

5. A method for managing access to an electronic device, said method comprising:
   (a) sending first identification data associated with a first electronic device to a second electronic device;
   (b) receiving, in said first device, from said second device a digital certificate encrypted using a first private key of said second device, said digital certificate having second identification data associated with said second device and a second public key of said second device;

(c) encrypting said first identification data in said second device using a second private key associated with said second device to generate first encrypted identification data;

(d) receiving, in said first device, from said second device said first encrypted identification data;

(e) decrypting in said first device, using a first public key to obtain said second public key, said encrypted digital certificate received from said second device, said first public key being stored in said first device;

(f) decrypting said first encrypted identification data using said second public key to generate a first decrypted identification data;

(g) authenticating said second device by comparing said first decrypted identification data to said first identification data;

(h) sending to said second device second encrypted identification data, said second encrypted identification data being encrypted in said first device using said second public key of said second device; and (i) establishing a communication channel between said first and said second devices.

6. A method for managing access between a plurality of electronic devices, comprising:

sending first message data from a first electronic device to a second electronic device, the first message data comprising first identification data associated with said first device and a date and time stamp;

receiving, in said first device, from said second device digital certificate data encrypted using a first private key of said second device, said digital certificate data comprising second identification data associated with said second device and a second public key of said second device;

receiving, in said first device, from said second device said first message data encrypted using a second private key of said second device;

authenticating said second device in response to said digital certificate data and said encrypted first message data;

encrypting said first message data using a public key related to the second private key of said second device to generate a second encrypted message data;

sending said second encrypted message data to said second device; and establishing a communication channel between said first and said second devices in response to the authentication of said second device;

wherein, said authenticating comprises: decrypting said digital certificate in said first device using a first public key stored in said first device; decrypting said first encrypted message using said public key used to generate said second encrypted message to generate a first decrypted message; and comparing said first decrypted message to said first message.

* * * * *